US006914968B1

(12) United States Patent
Ryley et al.

(10) Patent No.: US 6,914,968 B1
(45) Date of Patent: Jul. 5, 2005

(54) METHOD AND APPARATUS FOR TELEPHONE CALL FRAUD DETECTION AND PREVENTION

(75) Inventors: Gordon Bradley Ryley, Calgary (CA); Sheldon Dean McCullough, Delta (CA)

(73) Assignee: VTech Communications, Ltd., Tai Po (HK)

( * ) Notice: Subject to any disclaimer, the term of this patent is extended or adjusted under 35 U.S.C. 154(b) by 733 days.

(21) Appl. No.: 09/628,147

(22) Filed: Jul. 28, 2000

(30) Foreign Application Priority Data

Aug. 5, 1999 (CA) .............................................. 2279684

(51) Int. Cl.⁷ ................................................ H04M 3/00
(52) U.S. Cl. .............................. 379/188; 379/7; 379/35; 379/199; 379/200
(58) Field of Search ....................... 379/7, 22.03, 29.08, 379/114.14, 127.02, 140, 145, 155, 188, 189, 194, 195, 200, 399.01, 32.01, 32.04, 35, 199

(56) References Cited

U.S. PATENT DOCUMENTS

| | | | | |
|---|---|---|---|---|
| 3,899,640 A | * | 8/1975 | Piacente et al. ............ | 379/200 |
| 4,085,302 A | | 4/1978 | Zenk et al. | |
| 4,313,108 A | | 1/1982 | Yoshida | |
| 4,816,811 A | | 3/1989 | Bogatin et al. | |
| 4,885,767 A | * | 12/1989 | Therrien ..................... | 379/189 |
| 4,885,768 A | * | 12/1989 | Genin ......................... | 379/200 |
| 4,901,074 A | | 2/1990 | Sinn et al. | |
| 4,937,854 A | * | 6/1990 | Sarakas ....................... | 379/199 |
| 4,953,202 A | * | 8/1990 | Newell ........................ | 379/200 |
| 4,989,239 A | * | 1/1991 | McGarry ..................... | 379/145 |
| 5,003,586 A | * | 3/1991 | Wright ........................ | 379/200 |
| 5,086,459 A | * | 2/1992 | Perry .......................... | 379/200 |
| 5,418,760 A | | 5/1995 | Kawashima et al. | |
| 5,436,959 A | * | 7/1995 | Dake et al. .................... | 379/7 |
| 5,559,874 A | * | 9/1996 | Panosh ........................ | 379/189 |
| 5,572,573 A | | 11/1996 | Sylvan et al. | |
| 5,584,054 A | | 12/1996 | Tyneski et al. | |
| 5,613,137 A | | 3/1997 | Bertram et al. | |
| 5,674,018 A | | 10/1997 | Kaufman et al. | |
| 5,742,894 A | | 4/1998 | Jambhekar et al. | |
| 5,805,686 A | | 9/1998 | Moller et al. | |
| 5,809,125 A | | 9/1998 | Gammino | |
| 5,818,924 A | | 10/1998 | King et al. | |

(Continued)

FOREIGN PATENT DOCUMENTS

| | | | |
|---|---|---|---|
| CA | 2116462 | 4/1995 | |
| CA | 2236086 | 12/1998 | |
| EP | 0 239 455 | 3/1987 | ............ H04M/1/66 |
| EP | 0 813 328 | 12/1997 | |
| GB | 2274043 | 7/1994 | ............ H04M/1/66 |
| JP | 402137566 A | * 11/1988 | |
| JP | 1091305 | 4/1989 | |
| WO | WO 97/41677 | 11/1997 | |

*Primary Examiner*—Bing Q. Bui
(74) *Attorney, Agent, or Firm*—Pillsbury Winthrop Shaw Pittman LLP

(57) ABSTRACT

The present disclosure discloses a method and apparatus for detecting and preventing telephone call fraud. The call fraud detector apparatus is connected to the telephone line, and includes a telephone line interface with switch hook. A parallel set detector indicates to the microcontroller that another device has gone off hook on the telephone line. The microcontroller causes the telephone line interface switch hook to also go off hook in parallel, thereby preventing pulse dialing by the other device. The device may also include a DTMF tone detector and generator to prevent DTMF dialing on the telephone line. The call fraud detector can provide a visual, audible, and/or tactile indication when unauthorized use of the telephone line occurs, and can be enabled or disabled by an external device. The call fraud detector can log the time and date of each unauthorized call placed on a line, and can also notify the telephone service provider when an unauthorized call is attempted.

17 Claims, 3 Drawing Sheets

U.S. PATENT DOCUMENTS

| | | | |
|---|---|---|---|
| 5,818,931 A | * 10/1998 | Movassaghi | 379/445 |
| 5,887,995 A | 3/1999 | Holehan | |
| 5,889,836 A | * 3/1999 | Nataf | 379/7 |
| 5,909,211 A | 6/1999 | Combs et al. | |
| 5,910,099 A | 6/1999 | Jordan, Jr. et al. | |
| 5,917,906 A | 6/1999 | Thornton | |
| 5,991,881 A | * 11/1999 | Conklin et al. | 713/201 |
| 6,396,916 B2 | * 5/2002 | Jordan | 379/189 |
| 6,442,265 B1 | * 8/2002 | Harlow et al. | 379/189 |

* cited by examiner

METHOD AND APPARATUS FOR TELEPHONE CALL FRAUD DETECTION AND PREVENTION

BACKGROUND OF THE INVENTION

Telephone toll call fraud has become a prevalent problem for many telephone service companies and their subscribers in many telephone markets, including the United States and Canada. Call fraud arises when a thief uses a telephone subscriber's telephone line without authorization to place outgoing telephone calls or accept incoming collect calls such that the subscriber, and not the thief, incurs the costs charged by the telephone network operator.

A thief may perpetrate telephone fraud by connecting a telecommunication device to an unsuspecting telephone service subscriber's line at a location outside the subscriber's premises. A thief may simply plug a telephone into an outside telephone jack such as may be found by a backyard patio or may go to the extreme step of physically tapping into a telephone company's electrical junction box usually mounted on the outside of a subscriber's home or office. When the subscriber is away from his or her home or office, thieves may utilize the subscriber's telephone line without authorization with all charges being billed to the subscriber. The telephone line may be improperly used for many applications, such as making long-distance telephone calls, sending facsimile machine transmissions or computer communications or accepting incoming telephone calls from a thiefs accomplice who reverses the telephone charges such that they are billed to the subscriber.

Exacerbating this problem is the fact that telephone lines and junction boxes are generally not well secured—indeed, many junction boxes are not even locked such that tampering is often easy. Additionally, many thieves will utilize the seized line at night and other hours, when the subscriber is not likely to attempt to use the telephone line thereby minimizing the likelihood of being discovered. Unauthorized use of a telephone line can often continue to go undetected until the subscriber receives his or her telephone bill at the end of the billing cycle. Unless long distance charges appear itemized on the telephone bill the subscriber may still not detect the call fraud.

Telephone fraud results in great inconvenience to the subscriber, and significant monetary loss to the telephone company. The subscriber must go through the trouble of contacting the telephone company, perhaps filing a report, and then sorting through the often lengthy list of telephone calls to determine which calls are fraudulent or otherwise attempt to establish that bulk billed time is not all attributable to calls placed by the subscriber. Meanwhile, as the telephone company is unable to directly recover the cost of fraudulent telephone calls, which typically involve expensive long distance or international service, all subscriber's typically pay for such losses through increased telephone tariff rates approved by local regulatory agencies.

It is therefore an object of this invention to provide an apparatus and method for the detection and prevention of unauthorized telephone calls.

It is also an object of this invention to provide prompt notification to the telephone company when a line is being used without authorization in order to minimize the cost of unauthorized use of a telephone line.

It is a further object of the present invention to provide for the apprehension of those engaging in call fraud, and to assist the subscriber in determining which calls were placed without authorization by logging the time, date, and/or dialed number for each unauthorized call.

These and other objects of the present invention shall become apparent in light of the present specification and drawings

SUMMARY OF THE INVENTION

The present invention comprises a method and apparatus for detecting and preventing unauthorized use of a telephone line. The call fraud detector is connected to the telephone line. The device monitors the telephone line to determine when a second device connected to the line goes off hook. Once the second device goes off hook, the call fraud detector also goes off hook in parallel. Because two devices are in parallel, the second unauthorized device cannot dial out using pulse dialing.

The device may include a security switch for activating and deactivating the call fraud detector. The device may also be activated and/or deactivated by an external circuit, such as a timer circuit or security alarm system.

The call fraud detector may function to preclude DTMF dialing on the line by detecting DTMF signals, generating a constant DTMF signal, and applying the constant DTMF signal to the telephone line, thereby blocking any other device's attempt to dial. The call fraud detector may also be set to block dialing by generating a DTMF tone only after detecting a programmable dialing sequence on the line, thereby for example blocking only long distance calls, or calls to a specific number or area code. Furthermore, the detector can log the date, time, and/or dialed number for each use of the telephone line.

The call fraud detector can provide warning when a call on the line is in progress by triggering visual, audible, and/or tactile indicators. The detector may also alert the telephone company as to the occurrence of unauthorized use of the line by extended DTMF signaling or a digital data transmission or by any other signaling means.

DETAILED DESCRIPTION OF THE INVENTION

Figure 1:
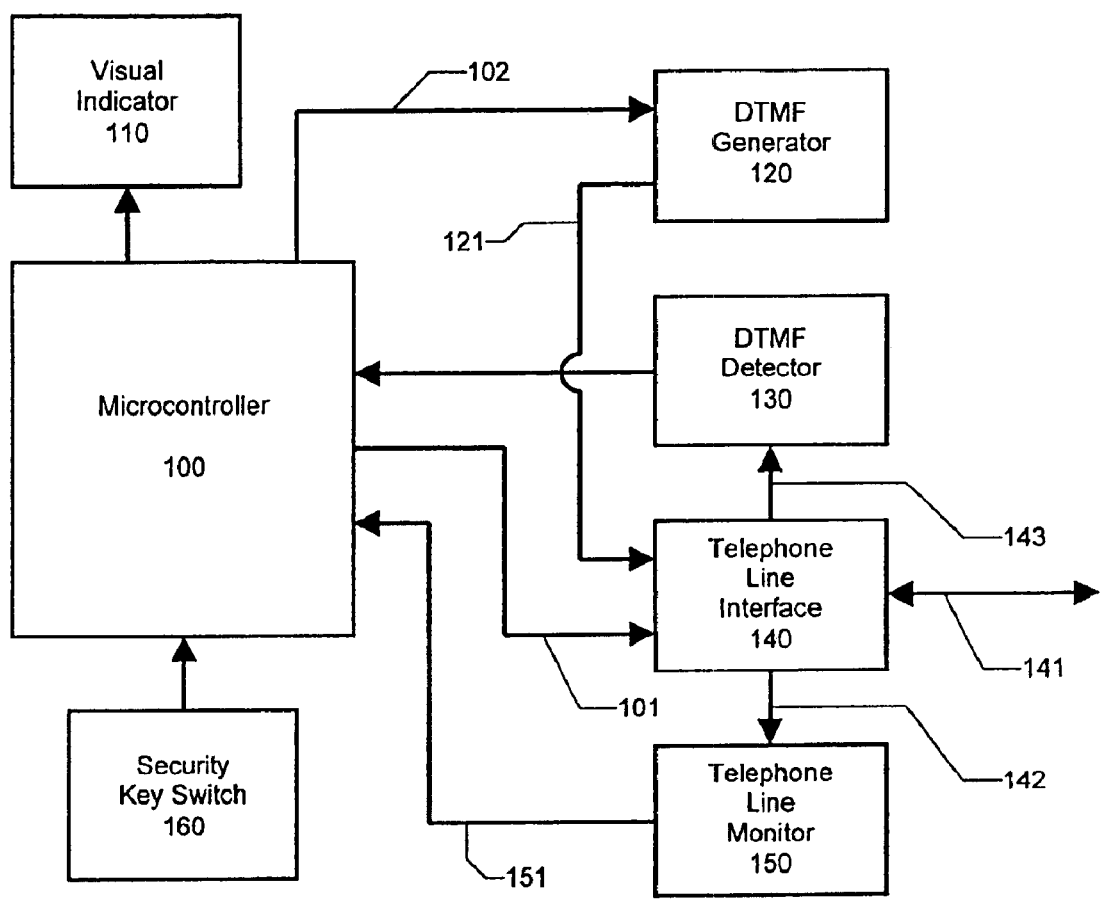
FIG. 1 is a schematic block diagram of one embodiment of the invention, in which a DTMF generator is provided such that the device can prevent outgoing dialing, and report attempted fraudulent calls.

While this Invention is susceptible to embodiment in many different forms, there are shown in the drawings and will be described in detail herein several specific embodiments, with the understanding that the present disclosure is to be considered as an exemplification of the principle of the invention and is not intended to limit the invention to embodiments illustrated.

FIG. 1 of the drawings illustrates a block diagram of the present device comprising a call fraud detector. The device includes at least microcontroller 100, telephone line interface 140, and telephone line monitor 150. Telephone line interface 140 is electrically connected to outside telephone network line 141, and includes a switch hook which may be in either an on-hook or off-hook position. The position of the switch hook is controlled by microcontroller 100 via electrical connection 101.

The telephone line voltage is provided to telephone line monitor 150 via connection 142. Telephone line monitor 150 determines when the telephone line 141 is in use by a device connected to telephone line 141 e.g. when any telephone device attached to the subscriber's line goes off-hook. Monitor 150 may in one embodiment comprise a current monitor, which upon detecting a change in the loop current from the telephone central office serves to provide an electrical signal indicating to microcontroller 100 via connection 151 that a parallel extension has changed hook status—thereby signaling that a telephone device may be attempting to make or receive a telephone call using the subscriber's line.

Upon receipt of a signal via connection 151 indicating that a parallel extension has gone off-hook, microcontroller 100 provides a control signal to the telephone line interface 140 via connection 101 to change the switch hook in interface 140 to the off-hook position. By taking interface 140 "off hook" in parallel with the unauthorized device, the unauthorized device is unable to utilize the telephone line to make an unauthorized telephone call using pulse dialing.

The embodiment of FIG. 1 also illustrates security switch 160 electrically connected to microcontroller circuit 100. Security switch 160 can alternately occupy an enabled or a disable state. This switch 160 allows the user to keep the present apparatus disabled such that telephone line interface 140 can remain connected to telephone network line 141 during times when the user would commonly use the telephone. By placing switch 160 into the disabled state, the device will not react to signals generated by telephone line monitor 150. When the user is sleeping, is away from home for a period of time, or otherwise does not authorize use of his telephone line, security key switch 160 can be placed into the enabled state so that the device will act as described herein to detect and prevent unauthorized use of the subscriber's telephone line.

The embodiment of FIG. 1 further includes DTMF detector 130, which may detect a single or sequence of DTMF tones. DTMF detector 130 is connected to the phone line via electrical connection 143 to telephone interface 140. In one embodiment, DTMF detector 130 outputs a signal to microcontroller 100 when DTMF signals are detected on the telephone line, thereby signaling that a device is attempting to dial an outgoing telephone number using the line. DTMF detector 130 may also optionally output the decoded DTMF signals to microcontroller 100. By outputting the actual decoded DTMF values, microcontroller 100 can detect and record the actual digits being dialed by an unauthorized user of the subscriber's line and may respond selectively to such dialing. For example, in one embodiment microcontroller 100 may respond to unauthorized dialing that begins with a 1 or 0, thereby preventing unauthorized long distance dialing without requiring the user to disable the device to place a local "toll-free" call. In another embodiment of the invention, the user may program specific dialing patterns into the microcontroller that signal the microcontroller when to block the dialing; whereby a device cannot complete a call to said specific programmed telephone numbers. As DTMF detector circuits are known in the art, a specific design is not disclosed herein.

In the embodiment of FIG. 1, microcontroller 100 can cause the transmission of DTMF signals, inband signals, out-of-band signals, or noise onto the telephone line by controlling DTMF generator 120 via connection 102. Such signal generators are known in the art and a specific design is not disclosed herein. DTMF generator 120 can be used in a number of capacities. For example, upon receiving indication from DTMF detector 130 that a telephone number is being dialed, microcontroller 100 may cause generator 120 to output a constant DTMF tone, thereby blocking any further DTMF dialing by the unauthorized device. DTMF generator 120 could also be used to signal the telephone company when unauthorized use of a telephone line is taking place. For example, upon receipt by microcontroller 100 of a signal from telephone line monitor 150, microcontroller 100 may cause DTMF generator 120 to output a predetermined DTMF signal from the extended DTMF set of dial tones. The central telephone company switch can then be programmed to recognize the extended DTMF tone as an indication that unauthorized use of a telephone line has been attempted.

Figure 2:
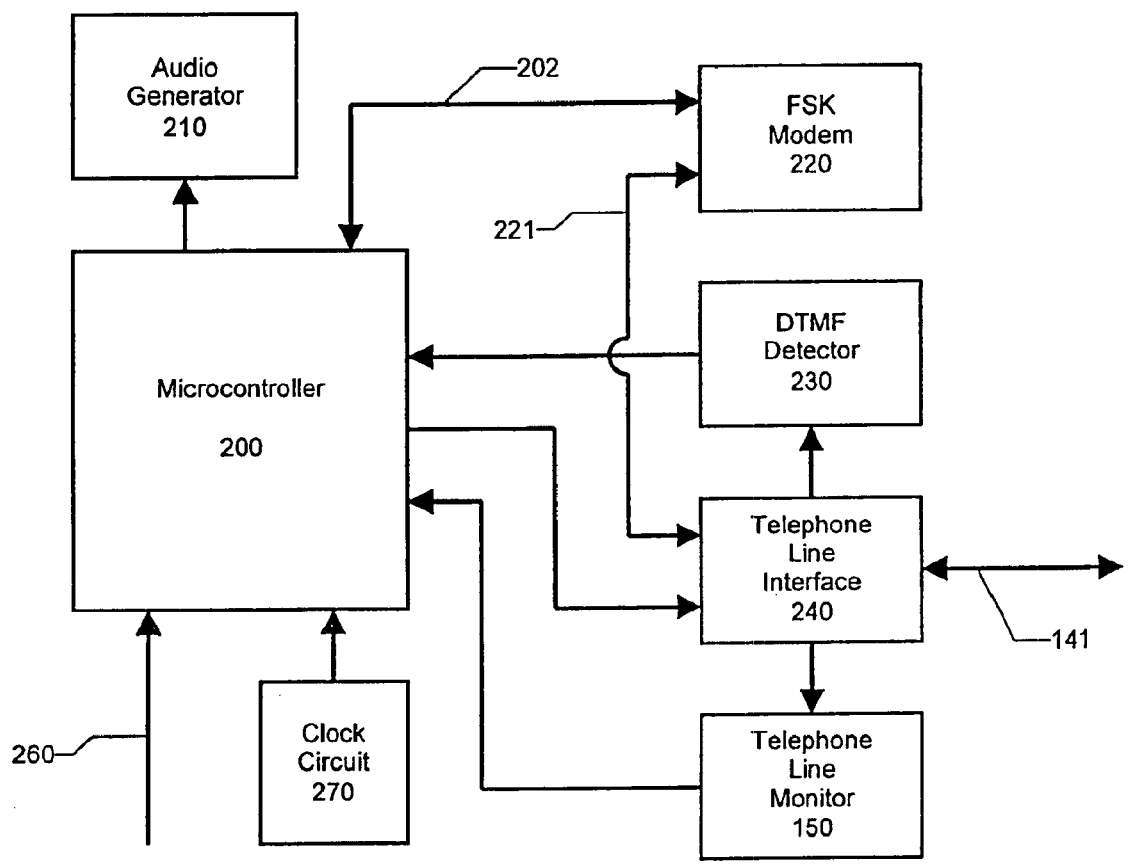
FIG. 2 is a schematic block diagram of a second embodiment of the present invention, which includes a digital data modem and clock circuit such that a record of unauthorized calls an be logged and reported.

The embodiments of FIGS. 2 and 3 function analogously to that of FIG. 1, except as described herein below. In FIG. 2, microcontroller 200 is shown having input signal 260 which serves to enable or disable the call fraud detector in response to a signal generated by an external device (not shown) communicated via connection 260. As one example of such use, the present invention could be used in conjunction with a property security system. When a user enables the security system, such as when departing the protected property, the security system could further enable the call fraud detector to also prevent unauthorized use of the telephone lines. It is contemplated that the security system could temporarily disable or override the call fraud detector to send an alarm message over the telephone line in a manner as described herein. When the user returns to the property and disables the security system, the security system could automatically disable the call fraud detector so as to permit normal usage of the telephone line.

Connection 260 may also be electrically connected to a clock circuit, such that the clock could enable and/or disable the device at specified times and/or days. For example, a home user could program a timer circuit to use connection 260 to automatically enable the call fraud detector after the time at which the user goes to sleep for the evening, and then disable the device in the morning. Similarly, a business owner could program the timer to automatically enable the call fraud detector after normal business hours, and disable the device prior to the start of normal business hours the following day.

The embodiment of FIG. 1 is further shown incorporating visual indicator 110. Visual indicator 110 serves to generate a visual indication of whether the device has detected unauthorized use of the telephone line. Visual indicator 110 is shown electrically connected to and controlled by microcontroller 100 and may consist of a flashing LED, a displayed text message, or other such means of visually conveying the occurrence and/or nonoccurrence of telephone line use while the call fraud detector is enabled.

The embodiment of FIG. 2 includes audio generator 210. Audio generator 210 serves to generate an audible alarm sound when the device detects unauthorized use of the telephone line. Audio generator 210 is electrically connected to and controlled by microcontroller 100 and may produce a constant or intermittent tone, a speech response, or other audible signal signaling unauthorized use of the telephone line.

Figure 3:
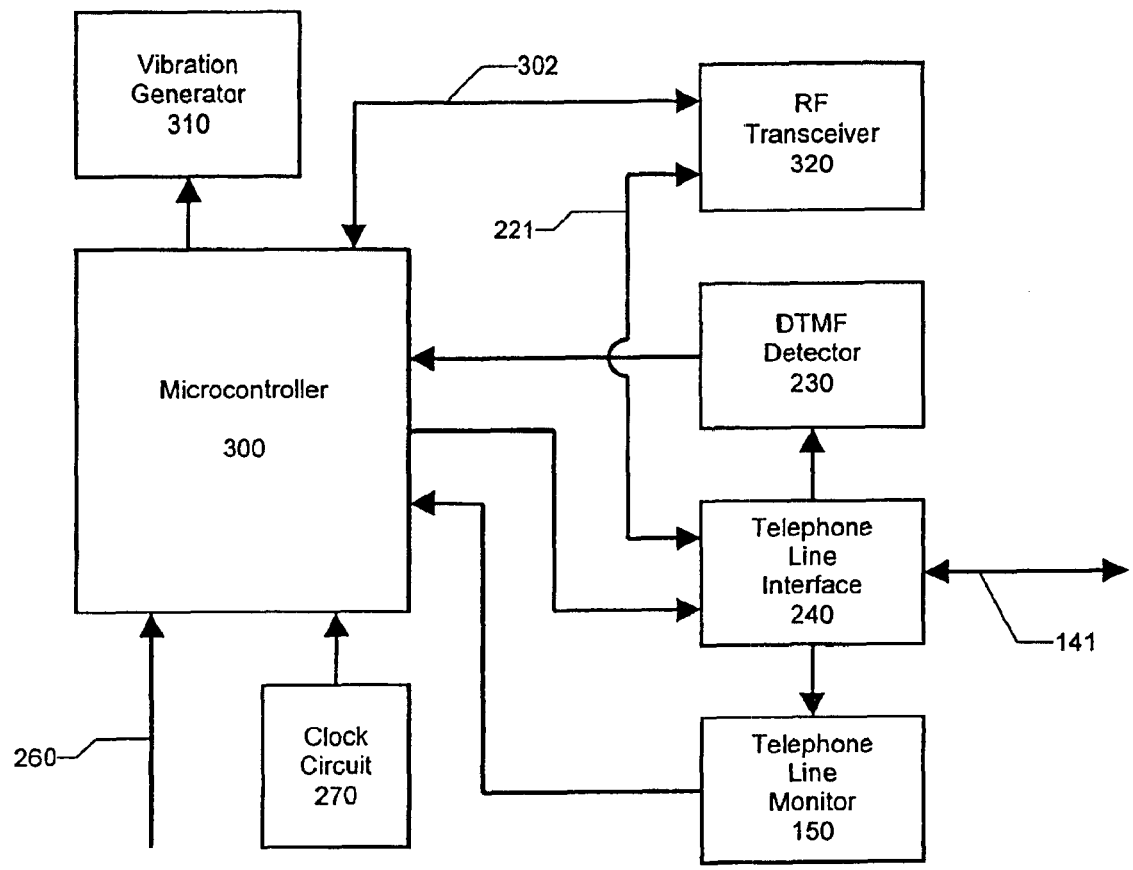
FIG. 3 is a schematic block diagram of a third embodiment of the present invention, which includes a wireless RF transceiver and a vibration generator circuit, such that indication of call fraud can be transmitted via wireless communications systems, and a user can be alerted to such fraud by a tactile vibratory response.

In the embodiment of FIG. 3, the user is notified when the device detects unauthorized use of the telephone line by a tactile, vibratory response rather than an audible response. Vibration generator 310 is electrically connected to and controlled by microcontroller 300, such that it produces a mechanical vibration upon indication from microcontroller 300 that unauthorized use of the telephone line is taking place. Vibration generator 310 can be useful, for instance, in a cordless telephone embodiment in which the user may carry a portable handset which can vibrate to physically indicate to the carrier that unauthorized use of the line is taking place.

The embodiment of FIG. 2 is shown further including telephone line data modem 220. Modem 220 is bidirectionally connected to microcontroller 200 via connection 202. Modem 220 can be used to initiate a data connection with the telephone network through connection 221 to telephone line interface 240 to transmit information regarding unauthorized use of the telephone line by a second device. The call fraud detector can accordingly provide dates, times, and/or dialed telephone numbers of unauthorized calls directly to the telephone company. Modem 220 may utilize FSK, MSK, GMSK, DQPSK, QAM, PCM, or any other suitable modulation scheme. In one example embodiment, modem 220 includes DTMF tone generator functionality, and generates DTMF tones to incorporate the functionality of DTMF generator 120 in the embodiment of FIG. 1.

The embodiment of FIG. 3 includes wireless RF transceiver 320, bidirectionally connected to microcontroller 300 via connection 302. Transceiver 320 provides a wireless means by which the call fraud detector can transmit information regarding unauthorized use of the telephone line, analogously to modem 220. For example, transceiver 320 can communicate over a cellular modem link with the telephone company, or over a wireless LAN, thereby providing a reliable warning of call fraud even when unauthorized users control land line communication.

The embodiment of FIG. 2 also includes clock circuit 270, electrically connected to microcontroller 200, which transmits the time and/or date to microcontroller 200. Microcontroller 200 includes digital memory, thereby allowing for the storage of the time and/or date of unauthorized telephone calls along with the dialed number, as received from DTMF detector 230. The embodiment of FIG. 2 can thereby maintain a complete log of the use of the telephone line to which it is connected.

The foregoing description and drawings merely explain and illustrate the invention and the invention is not limited thereto except insofar as the appended claims are so limited, inasmuch as those skilled in the art, having the present disclosure before them will be able to make modifications and variations therein without departing from the scope of the invention.

What is claimed is:

1. A method for preventing telephone calls from being initiated using a current loop wire line telephone connection, which method comprises:
   connecting a device incorporating a switch hook to a telephone line;
   detecting the use of the telephone line, by a telecommunication apparatus connected to the telephone line;
   activating the switch hook of the device to go off hook;
   detecting one or more Dual Tone Multi-Frequency signals on the telephone line;
   generating a constant Dual Tone Multi-Frequency signal in response to detecting one or more Dual Tone Multi-Frequency signals;
   applying the constant Dual Tone Multi-Frequency signal to the telephone line, whereby Dual Tone Multi-Frequency dialing cannot take place on the telephone line, and
   notifying the telephone company that an unauthorized call is in progress,
   the step of notifying the telephone company comprised of the substep of applying by the device a predetermined multi-frequency signal to the telephone line, whereby the device can utilize the extended Dual Tone Multi-Frequency signaling set to notify the telephone company that an unauthorized call is in progress, and whereby the telecommunication apparatus is unable to place an outgoing call using the telephone line.

2. The method of claim 1, further comprising enabling a security switch that can be enabled or disabled, wherein when the security switch is enabled, the switch hook is activated to go off hook during use of the telephone line by a telecommunications apparatus connected thereto.

3. The method of claim 2, in which the switch hook is enabled and/or disabled at predetermined times by an external circuit.

4. The method of claim 3, in which the external circuit is a property security system.

5. The method of claim 1, in which the step of detecting one or more Dual Tone Multi-Frequency signals comprises the substep of detecting a predetermined sequence of Dual Tone Multi-Frequency signals.

6. The method of claim 5, in which the predetermined sequence of Dual Tone Multi-Frequency signals is programmable.

7. The method of claim 1, further including the subsequent step of recording the time and date corresponding to each detected unauthorized use of the telephone line, whereby a record of attempted calls is made.

8. A method for preventing telephone calls from being initiated using a current loop wire line telephone connection which method comprises:
   connecting a device incorporating a switch hook to a telephone line;
   detecting the use of the telephone line, by a telecommunication apparatus connected to the telephone line;
   activating the switch hook of the device to go off hook;
   detecting one or more Dual Tone Multi-Frequency signals on the telephone line;
   generating a constant Dual Tone Multi-Frequency signal in response to detecting one or more Dual Tone Multi-Frequency signals;
   applying the constant Dual Tone Multi-Frequency signal to the telephone line, whereby Dual Tone Multi-Frequency dialing cannot take place on the telephone line, and
   notifying the telephone company that an unauthorized call is in progress,
   the step of notifying the telephone company comprised of the substep of
      initiating a digital communications link with the telephone company, and
      transmitting data indicating the occurrence of one or more unauthorized call attempts.

9. A method for preventing telephone calls from being initiated using a current loop wire line telephone connection, which method comprises:
   connecting a monitor device incorporating a switch hook to a telephone line;
   detecting the use of the telephone line, by a telecommunication apparatus connected to the telephone line;
   activating the switch hook of the device to go off hook;
   detecting one or more Dual Tone Multi-Frequency signals on the telephone line;

generating a constant Dual Tone Multi-Frequency signal in response to detecting one or more Dual Tone Multi-Frequency signals;

applying the constant Dual Tone Multi-Frequency signal to the telephone line, whereby Dual Tone Multi-Frequency dialing cannot take place on the telephone line, and notifying the telephone company that an unauthorized call is in progress, the step of notifying the telephone company comprised of the substep of initiating a digital communications link with the telephone company; and transmitting data indicating the occurrence of one or more unauthorized call attempts, in which the step of transmitting data indicating the occurrence of one or more unauthorized call attempts further includes the substep of transmitting data indicating the time and date of the unauthorized call attempts.

10. The method of claim 9, wherein the monitor device comprises:

a telephone line interface for connection to a telephone network line, in which the switch hook alternatively places the device in an on-hook or off-hook position, whereby the telecommunication apparatus operatively connected to the telephone network line is unable to place an outgoing call using the telephone network line when the device is in an off-hook position;

a line monitor circuit connected to the telephone line interface, which circuit provides an output signal when a telephone device operatively connected to the telephone line has gone off hook; and a microcontroller circuit electrically connected to the parallel set detection circuit output, the microcontroller providing an output which controls the state of the hook switch.

11. The method of claim 10, wherein the monitor device further includes a security switch, which switch enables and disables operation of the switch hook, the switch being electrically connected to the microcontroller circuit.

12. The method dee of claim 10, wherein the monitor device further includes a Dual Tone Multi-Frequency signal detector with an input electrically connected to the telephone line, and output electrically connected to the microcontroller circuit, whereby the Dual Tone Multi-Frequency detector outputs decoded Dual Tone Multi-Frequency signals to the microcontroller.

13. The method of claim 10, wherein the monitor device further includes a clock circuit electrically connected to the microcontroller circuit.

14. The method of claim 12, wherein the monitor device further includes a Dual Tone Multi-Frequency signal generator, having an input electrically connected to the microcontroller circuit, and which output is electrically connected to the telephone line.

15. The method of claim 12, wherein the monitor device further includes a telephone line data modem connected to the microcontroller circuit, and also connected to the telephone line, whereby the modem provides for digital communications between the microcontroller and the telephone network.

16. The method of claim 12, wherein the monitor device further includes a wireless RF transceiver connected to the microcontroller circuit, whereby the transceiver provides for communications indicating unauthorized call activity between the microcontroller and a wireless communications network.

17. The method of claim 12, wherein the monitor device further includes an indicating means, electrically-connected to the microcontroller circuit, whereby the indicating means provides indication to the device user of whether the telephone line is being used.

* * * * *